Figure 1:
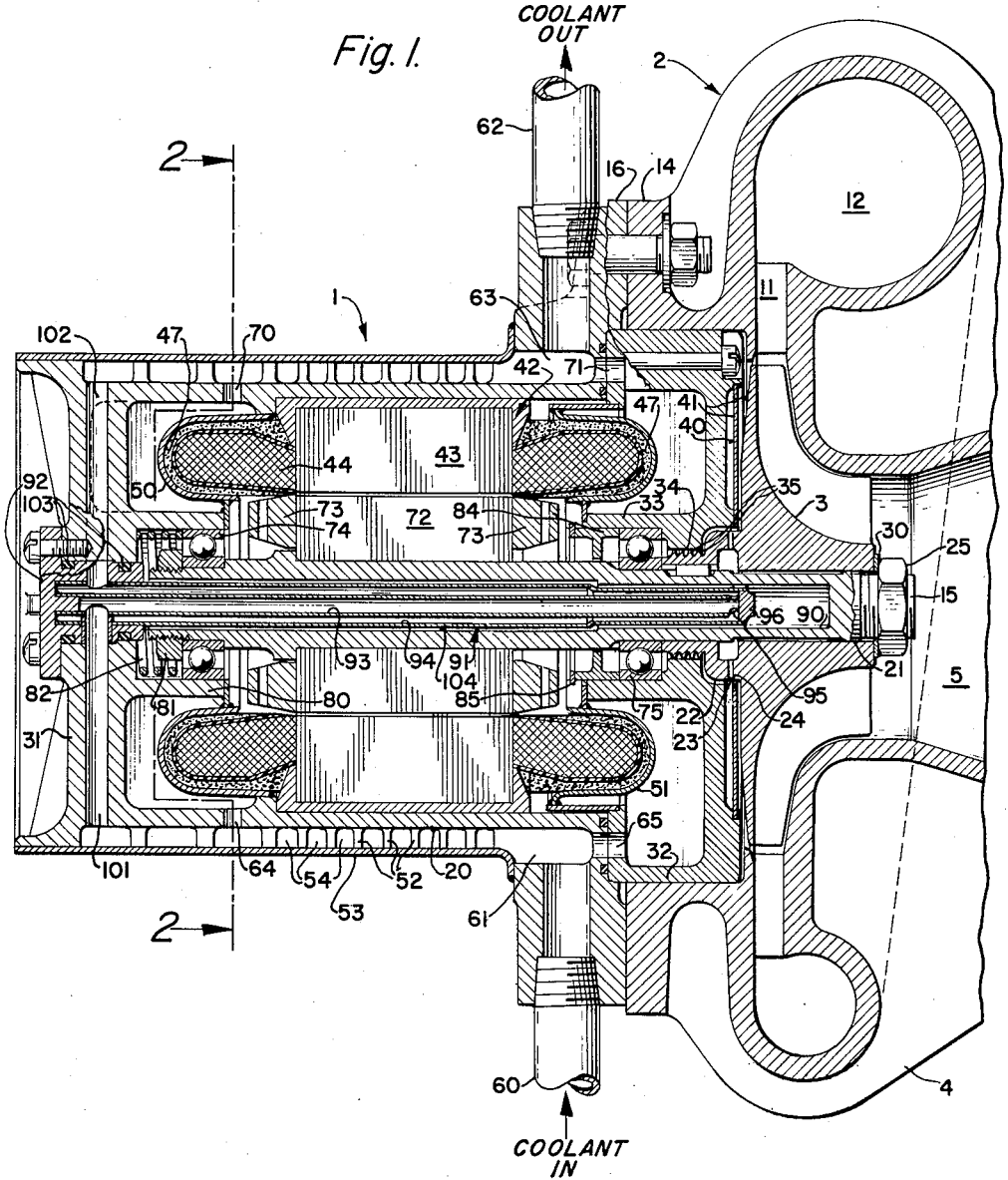

Oct. 23, 1962  H. A. GREENWALD  3,060,335
FLUID COOLED DYNAMOELECTRIC MACHINE
Filed Feb. 7, 1961  2 Sheets-Sheet 1

INVENTOR:
HAROLD A. GREENWALD,
BY
William E. Martin
Agent.

Oct. 23, 1962  H. A. GREENWALD  3,060,335
FLUID COOLED DYNAMOELECTRIC MACHINE
Filed Feb. 7, 1961  2 Sheets-Sheet 2

INVENTOR:
HAROLD A. GREENWALD,
BY
William E. Martin
Agent.

United States Patent Office

3,060,335
Patented Oct. 23, 1962

3,060,335
FLUID COOLED DYNAMOELECTRIC MACHINE
Harold A. Greenwald, Los Angeles, Calif., assignor to The Garrett Corporation, Los Angeles, Calif., a corporation of California
Filed Feb. 7, 1961, Ser. No. 87,701
5 Claims. (Cl. 310—54)

My invention relates to liquid cooling means for rotating machinery, and, more particularly, to dynamoelectric machinery incorporating provision for the circulation of liquid in heat transfer relation with both the stationary and rotating members thereof.

Where a dynamoelectric machine is required to operate for an extended period under conditions of high load or high ambient temperature or both, it is desirable that means be provided for the withdrawal of heat therefrom so as to maintain the relatively moving parts thereof at a temperature favorable to longevity and reliability as well as to efficiency of operation. Though the provision of liquid cooling jackets for various types of rotating machinery is well known in the mechanical arts, the application of such measures to dynamoelectric machinery is characterised by difficulties peculiar thereto in that the insulation, windings and electrically conducting elements thereof are acutely sensitive to the presence of moisture, and even a slight leakage of liquid, such as might arise from a faulty seal, for example, cannot be tolerated.

Though numerous expedients for the liquid cooling of dynamoelectric machines have been put forth in the prior art, those by which it has been proposed to extend such cooling to the rotating elements of such machines have generally been dependent on some form of rotary seal whereby leakage of coolant liquid from the interior of the rotor shaft is inhibited by means of a suitable element, usually of resilient material, maintained in wiping contact with the rotating surface of said shaft. As is well known, such rotary seals are a common source of mechanical trouble, extraordinary care in their manufacture and installation being generally required if frequent replacement due to wear, leakage and otherwise inadequate performance is to be avoided. Accordingly, it is an object of the present invention to provide a novel construction for a dynamoelectric machine wherein a liquid coolant is conducted internally of the rotor thereof and in heat exchange relation therewith, but without the necessity for providing a liquid-tight seal between relatively rotating surfaces.

It is another object of my invention to provide a construction for a fluid cooled dynamoelectric machine which is particularly adapted for operation in a high temperature environment, provision being made for the inhibition of both conductive and radiant transfer of heat to the principal electrical and mechanical elements thereof.

It is another object of my invention to provide a liquid cooled dynamoelectric machine having an exterior coolant jacket which is divided into annular chambers of graduated width, said graduation being adapted to distribute a cooling liquid axially of said machine in accordance with the cooling requirements thereof.

It is another object of my invention to provide a dynamoelectric machine wherein the principal rotating member is adapted to receive a coolant duct internally and coaxially thereof, the annular space between the internal surface of said member and the external surface of said duct being filled with a gaseous fluid which is continuously circulated between said surfaces so as to favor efficient transfer of heat from said rotating member to said coolant duct.

It is another object of my invention to provide a construction in which said circulation of fluid is jointly motivated by the rotation of said member and the temperature gradient extending radially of said annular space.

Figure 2:
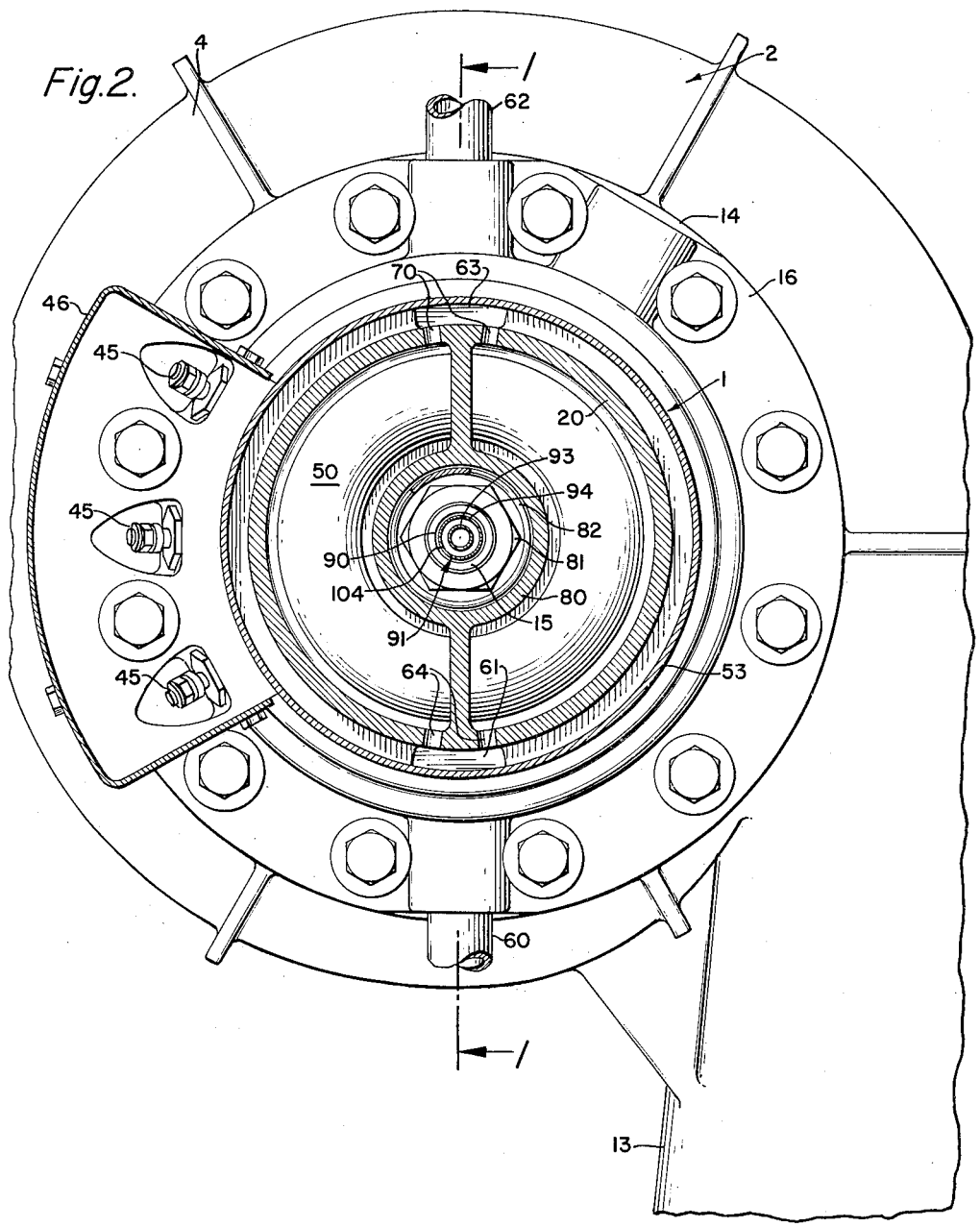

The manner in which I accomplish these and other objects which will be made apparent hereinafter may be more clearly understood from the following description of a preferred embodiment of my invention, the description being taken in conjunction with the accompanying drawings wherein:

FIG. 1 is a cross-section taken at the line 1—1 of FIG. 2 showing a dynamoelectric machine according to the present invention, the machine being connected in driving relation with a fluid pressure machine; and FIG. 2 is a cross-section taken at the line 2—2 of FIG. 1.

The drawings show a construction wherein a dynamoelectric machine 1 is adapted for coaxial rotation with a fluid pressure machine 2, said machines being hereinafter referred to as a motor and a compressor, respectively, it being understood, however, that the principal features of the construction illustrated may, of course, be adapted to other applications where heat dissipation is required, for example, where it is desired to couple a turbine in coaxial driving relation with a generator or alternator.

The compressor 2 comprises a centrifugal impeller 3 housed in a unitary casing 4 which includes an inlet portion 5, a diffuser portion 11, a scroll 12, an outlet portion 13 and an annular coupling flange 14, the impeller 3 being operatively connected with the motor shaft 15, and the coupling flange 14 being secured by appropriate means to a corresponding flange 16 of the motor housing 20.

In order to provide a compact assembly having minimal paths for conductive transfer of heat between the driving and driven members thereof, the motor 1 and the compressor 2 are coaxially coupled as shown, operative connection between the impeller 3 and the motor output shaft 15 being provided by a relatively short land 21 adapted to engage the axial bore of the impeller, and by a coupling sleeve 22 keyed to the shaft 15 and having a radially extending toothed flange or face spline 23 adapted to engage a correspondingly toothed portion 24 provided on the rear face of the impeller, the impeller being retained on the shaft 15 and urged into torque transmitting engagement with the coupling sleeve 22 by a nut 25 threadedly engaging the terminal portion of shaft 15 and secured against rotation relative thereto by well known means, such as lockwasher 30. It is to be understood that alternate means for coupling the impeller 3 to the shaft 15 may, of course, be used, the particular construction shown being merely a preferred arrangement having the advantage of a relatively long mounting base to assure concentricity and alignment of the respective members and yet permit radial expansion of the impeller, but at the same time to provide a minimal heat conductive area of metal-to-metal contact therebetween.

The cylindrical motor housing 20 is provided with an integral end bell 31 and a detachable end bell 32, the latter being adapted to fit into a recess formed by coupling flanges 14 and 16. The detachable end bell 32 is provided with an inwardly projecting bearing housing 33 which provides a passage for the emergent portion of shaft 15, said passage including a bore 34 adapted to cooperate with a grooved portion 35 of coupling sleeve 22 so as to form a labyrinth seal whereby circulation of fluid from the compressor 2 to the interior of the motor housing 20 is impeded. In order to inhibit radiant as well as conductive heat transfer from the compressor 2 to the motor 1, end bell 32 incorporates radiation shield means in the form of annular recess 40 and closure diaphragm 41 therefor, the outwardly facing surface of the latter preferably being polished to a specular finish.

Motor housing 20 is adapted to receive a stator or field assembly 42 which includes ferromagnetic laminations 43 and field windings 44, the latter being connectable to an electrical power circuit through terminals 45 mounted externally of housing 20 and enclosed by suitable shielding structure 46. Where field windings 44 extend axially beyond laminations 43 they may be encased, as at 47, in a suitable plastic material or plotting compound, preferably of a type characterized by properties of high dielectric strength and thermal conductivity. Annular end shields 50 and 51 surround the encased windings 44 so as to permit circulation of liquid coolant in heat exchange relation therewith through end bells 31 and 32.

Motor housing 20 is provided externally with a number of circumferential cooling fins 52 which, cooperatively with an outer casing 53, define a corresponding number of annular coolant ducts 54, the spacing of the fins 52, and hence the width of the ducts 54, being preferably graduated as shown in accordance with the axial variation in cooling requirements of the motor 1. The ducts 54 are placed in communication with a coolant inlet 60 via an axially aligned header 61 and with a coolant outlet 62 via a second header 63, passages 64 and 65 affording flow communication between inlet header 61 and the interior of end bells 31 and 32, and passages 70 and 71 affording flow communication between the interiors of said end bells and outlet header 63.

A rotor comprising ferromagnetic laminations 72, which are traversed by axial conductors (not shown) interconnected by end rings 73, and carried on shaft 15 is journaled in bearings 74 and 75 for rotation relative to the stator 42. Bearing 74 is housed in an inwardly projecting bearing housing 80 integral with end bell 31, the inner race of the bearing being positioned against a shoulder of shaft 15 and secured thereto by suitable means such as a nut 81, and the outer race being in thrust transmitting relation with a helical compression spring 82. Bearing 75 is housed in bearing housing 33 provided by end bell 32, the outer race of the bearing being retained therein by spacer 84 and snap ring 85. The spacer 84 may preferably be of T-shaped cross-section, as shown, so as to provide an additional radiation shield for the embarrassment of radiant heat transfer between the compressor 1 and the motor 2.

Shaft 15 is of tubular construction so as to accommodate provision for internal cooling means, axial bore 90 extending from the left hand end to a region adjacent the right hand end thereof as shown in the drawing. A cooling probe 91 is supported in cantilever fashion by a boss 92 appropriately secured in end bell 31, the probe 91 being coaxially aligned with the bore 90 and extending longitudinally thereof to a region adjacent the rear face of impeller 3. The probe 91 includes concentric inner and outer tubular members 93 and 94, respectively, flow communication therebetween being afforded by terminal orifices 95 adjacent to end closure 96. Inner tubular member 93 communicates via a first radial bore 101 with the coolant inlet header 61, and outer tubular member 94 communicates via a second radial bore 102 with the coolant outlet header 63, appropriate sealing means, such as O-rings 103, being provided to preclude leakage of coolant from around the boss 92 to either the exterior of end bell 31 or the interior of bearing housing 80.

Referring to FIG. 2, it will be seen that cooling probe 91 is separated from the wall of the bore 90 by an annular space 104 which is filled with gaseous fluid of the same charcter as that in compressor casing 4, the interior of the motor housing 20 being effectively vented by leakage past the labyrinth seal 34, 35 to the pressure at the rear face of the impeller 3. By virtue of the viscosity of said gaseous fluid and the relative rotation between shaft 15 and probe 91 the fluid in annular space 104 will be subjected to a velocity gradient radially thereof, fluid adjacent the outer surface of probe 91 remaining at rest and fluid adjacent the inner surface of bore 90 rotating at the same speed as shaft 15. Similarly, by virtue of the temperature difference between probe 91 and shaft 15 a radial density gradient will be established across the annular space 104, fluid adjacent the relatively cool probe 91 being of comparatively high density and fluid adjacent the relatively warm shaft 15 being of comparatively low density. Since the centrifugal force which acts on an element of the fluid is proportional to the density of the fluid comprising said element, a circulatory motion is established whereby the cooler, denser fluid in the region of the probe 91 is impelled outwardly toward the surface of the bore 90, and the warmer, less dense fluid which is thereby displaced is impelled inwardly toward the surface of the probe 91. Thus, by virtue of the density and velocity gradients occurring between the stationary probe 91 and the rotating shaft 15, a centrifugal pumping action is established whereby the fluid in annular space 104 is continuously circulated between the higher and lower temperature boundary walls thereof. In practice, it has been found that the efficiency of heat transfer afforded by this circulation closely approaches the efficiency achievable in comparable structures wherein a coolant liquid makes actual contact with the interior surface of a rotating shaft.

From the foregoing description, taken together with the accompanying drawings, it will be apparent that my invention provides improved heat dissipation means for a dynamoelectric machine and, more particularly, for such a machine that is coaxially and closely coupled and in driving relation with a fluid pressure machine. Further, the invention provides a unique shaft construction whereby the benefits of liquid cooling may be applied to dynamoelectric machinery without recourse to relatively rotating seals and without danger of coolant leakage to mechanical or electrical elements which might be injured thereby. It will be apparent to those skilled in the art that numerous variations on the construction shown and described may be made without departing from the essential spirit and scope of the invention as taught herein, the drawings and description of a preferred embodiment of the invention having been presented by way of example only, and not by way of limitation.

I claim:

1. A liquid cooled dynamoelectric machine which compises: a housing enclosing a stator; a coolant jacket surrounding said housing, said jacket including an inlet and an outlet spaced diametrically of said housing and means defining a plurality of parallel flow paths circumfluously thereof; bearing means in each end of said housing supporting a rotor inwardly and coaxially of said stator, said rotor including a shaft having one end enclosed by said housing and another end projecting axially therefrom; a coolant chamber in each end of said housing surrounding each of said bearing means, each of said chambers providing a flow path between said inlet and said outlet; means defining a bore extending axially of said shaft from the enclosed end thereof to a region adjacent said projecting end; an elongated probe coaxial with said bore and supported inwardly thereof, said probe comprising inner and outer tubular members defining a flow path internally and axially of said probe; and passage means connecting said flow path in parallel circuit with said chambers between said inlet and said outlet.

2. In combination with a fluid pressure machine and in coaxial driving relation therewith, a dynamoelectric machine which comprises: a stator defining a cylindrical cavity to contain a rotor, said stator including a magnetic core having electrical conductors wound thereon for inducing a magnetic field in said cavity; a housing enclosing said stator and including a first end bell adjoining said fluid pressure machine and a second end bell distal thereof, each of said end bells including a bearing coaxial with the cavity in said stator; a rotor for electrodynamic reaction with said stator journaled in said bearings, said rotor including a hollow shaft having an open end adjacent said second end bell and a closed end extending outwardly of said first end bell for driving engagement with said fluid pressure machine; a coolant jacket surrounding said housing and including an inlet and an outlet spaced diametrically thereof; means axially dividing said jacket into a plurality of annular ducts said ducts being interconnected by first and second axially aligned header passages spaced diametrically of said housing and communicating with said inlet and said outlet respectively; an elongated probe having a fixed end supported by said second end bell and a free end extending axially of said shaft in the hollow portion thereof, said probe comprising inner and outer tubular members defining a flow path for circulation of coolant axially of said probe; and passage means radially of said second end bell for connecting said inner tubular member of said probe with one of said header passages and said outer tubular member with the other of said header passages.

3. In combination with a fluid pressure machine and in coaxial driving relation therewith, a dynamoelectric machine which comprises: a stator defining a cylindrical cavity to contain a rotor, said rotor including a magnetic core having electrically conductive windings thereon for inducing a magnetic field in said cavity, said windings being of greater axial dimension than said core so as to overhang the ends thereof; a housing enclosing said stator and including a first end bell adjoining said fluid pressure machine and a second end bell distal thereof, each of said end bells including a bearing coaxial with the cavity in said stator; a rotor for electrodynamic reaction with said stator journaled in said bearings, said rotor including a hollow shaft having an open end adjacent said second end bell and a closed end extending outwardly of said first end bell for driving engagement with said fluid pressure machine; a coolant jacket surrounding said housing and including an inlet and an outlet spaced diametrically thereof; means axially dividing said jacket into a plurality of annular ducts, said ducts being interconnected by first and second axially aligned header passages spaced diametrically of said housing and communicating with said inlet and said outlet respectively; a shield in each of said end bells enclosing the overhanging portion of said windings, each of said shields forming a fluid-tight seal with said housing to define an annular coolant chamber internally of said end bell; means placing each of said chambers in flow communication with said inlet and said outlet; an elongated probe having a fixed end supported by said second end bell and a free end extending axially of said shaft in the hollow portion thereof, said probe comprising inner and outer tubular members defining a flow path for circulation of coolant axially of said probe; and passage means radially of said second end bell for connecting said inner tubular member with one of said header passages and said outer tubular member with said other header passage.

4. In combination with a fluid pressure machine and in coaxial driving relation therewith, a dynamoelectric machine which comprises: a stator defining a cylindrical cavity to contain a rotor, said rotor including a magnetic core having electrically conductive windings thereon for inducing a magnetic field in said cavity, said windings being of greater axial dimension than said core so as to overhang the ends thereof; a housing enclosing said stator and including a first end bell adjoining said fluid pressure machine and a second end bell distal thereof, each of said end bells including an inwardly projecting boss housing a bearing coaxial with said cavity; means defining an annular recess in the outer face of said first end bell, said recess being closed by a heat reflective diaphragm for opposing radiant heat transfer from said fluid pressure machine to said dynamoelectric machine; a rotor for electrodynamic reaction with said stator journaled in said bearings, said rotor including a hollow shaft having an open end adjacent said second end bell and a closed end extending outwardly of said first end bell for driving engagement with said fluid pressure machine; a coolant jacket surrounding said housing and including an inlet and an outlet spaced diametrically thereof; means axially dividing said jacket into a plurality of annular ducts, said ducts being interconnected by first and second axially aligned header passages spaced diametrically of said housing and communicating with said inlet and said outlet respectively; a shield in each of said end bells enclosing the overhanging portion of said windings, each of said shields forming a fluid-tight seal with said housing to define an annular coolant chamber internally of said end bell; means placing each of said chambers in flow communication with said inlet and said outlet; an elongated probe having a fixed end supported by said second end bell and a free end extending axially of said shaft in the hollow portion thereof, said probe comprising inner and outer tubular members defining a flow path for circulation of coolant axially of said probe; and passage means radially of said second end bell for connecting said inner tubular member with one of said header passages and said outer tubular member with said other header passage.

5. In combination with a fluid pressure machine and in coaxial driving relation therewith, a dynamoelectric machine which comprises: a stator defining a cylindrical cavity to contain a rotor, said rotor including a magnetic core having electrically conductive windings thereon for inducing a magnetic field in said cavity, said windings being of greater axial dimension than said core so as to overhang the ends thereof; a housing enclosing said stator and including a first end bell adjoining said fluid pressure machine and a second end bell distal thereof, each of said end bells including an inwardly projecting boss housing a bearing coaxial with said cavity; means defining an annular recess in the outer face of said first end bell, said recess being closed by a heat reflective diaphragm for opposing radiant heat transfer from said fluid pressure machine to said dynamoelectric machine; a rotor for electrodynamic reaction with said stator journaled in said bearings, said rotor including a hollow shaft having an open end adjacent said second end bell and a closed end extending outwardly of said first end bell for driving engagement with said fluid pressure machine; a coolant jacket surrounding said housing and including an inlet and an outlet spaced diametrically thereof; a plurality of fins circumferentially of said housing for dividing said jacket into annular ducts, said fins being graduately spaced to provide relatively narrow ducts in the region of said first end bell and relatively wide ducts in the region of said second end bell, said ducts being interconnected by first and second axially aligned header passages spaced diametrically of said housing and communicating with said inlet and said outlet respectively; a shield in each of said end bells enclosing the overhanging portion of said windings, each of said shields forming a fluid-tight seal with said housing to define an annular coolant chamber internally of said end bell; means placing each of said chambers in flow communication with said inlet and said outlet; an elongated probe having a fixed end supported by said second end bell and a free end extending axially of said shaft in the hollow portion thereof, said probe comprising inner and outer tubular members defining a flow path for circulation of coolant axially of said probe; and passage means radially of said second end bell for connecting said inner tubular member with one of said header passages and said outer tubular member with said other header passage.

No references cited.